UNITED STATES PATENT OFFICE.

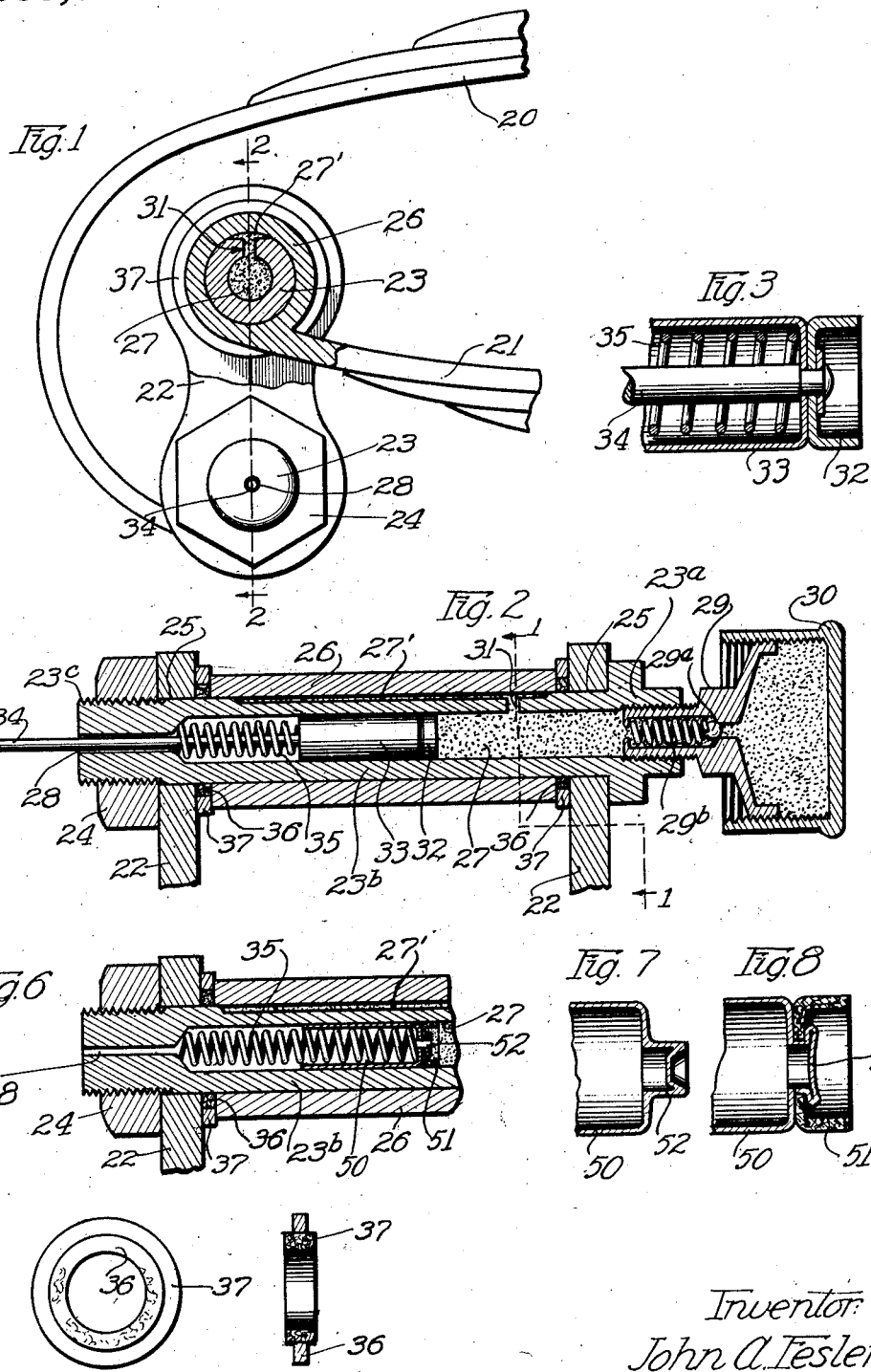

JOHN ANDREW FESLER, OF DETROIT, MICHIGAN.

LUBRICATING APPARATUS.

1,355,901.  Specification of Letters Patent.  Patented Oct. 19, 1920.

Application filed February 21, 1920. Serial No. 360,495.

*To all whom it may concern:*

Be it known that I, JOHN A. FESLER, a citizen of the United States, residing at Detroit, in the county of Wayne and State of Michigan, have invented a certain new and useful Improvement in Lubricating Apparatus, of which the following is a full, clear, and concise description, reference being had to the accompanying drawings, forming a part of this specification.

My invention relates to lubricating apparatus and is particularly concerned with the provision of means for securing and at all times maintaining a sufficient quantity of grease or other lubricant between the wearing surfaces of shackle bolts, king bolts, etc., and the parts with which they coöperate. While the improvements of my invention are particularly advantageous when utilized in connection with shackle bolts and king bolts, and while in the accompanying drawings I have illustrated my invention as applied to a shackle bolt construction, I appreciate the fact that my invention can be used for the purpose of lubricating practically all types of bearings which consist of a male element in the form of a bolt or other similar part and a female element in the form of a sleeve or partial sleeve.

Specifically, my present invention is directed to the construction and combination of certain parts designed to improve the bolt construction described and claimed in my co-pending application, Serial No. 319,673, filed August 25, 1919.

I shall proceed at once with the description of the accompanying drawings in which Figure 1 is a fragmentary view of the upper and lower portions of an automobile spring which are connected by shackles and shackle bolts embodying my invention. The sectional portion of this view may be regarded as taken on line 1—1 of Fig. 2.

Fig. 2 is a longitudinal sectional view of one of the shackle bolts, this view being taken on line 2—2 of Fig. 1.

Fig. 3 is an enlarged fragmentary sectional view of the plunger elements of the shackle bolt shown in Fig. 2.

Fig. 4 is an isolated axial sectional view of one of the pairs of yielding and non-yielding concentric washers.

Fig. 5 is an isolated side elevational view thereof.

Fig. 6 is a fragmentary sectional view, corresponding to Fig. 2, illustrating a modified plunger construction.

Fig. 7 is an isolated fragmentary sectional view of the drawn metal portion of the said modified plunger construction before the application of the cup-leather thereto and Fig. 8 is a similar view of the same with the cup-leather secured in position.

Similar characters of reference refer to similar parts throughout the several views.

Referring to the drawings, the reference characters 20 and 21 indicate the ends of the upper and lower portions of an automobile spring which are connected by a pair of shackles 22—22, with which coöperate the shackle bolts 23—23, embodying the improvements of my invention.

Externally the form of the shackle bolt herein shown is substantially identical with shackle bolts now in general use, the bolt comprising a flanged head $23^a$ and a cylindrical shank $23^b$, which at the end thereof opposite the head is provided with external screwthreads $23^c$ arranged to coöperate with the usual nut 24. The body portion or shank of the shackle bolt in each case extends through registering apertures 25—25, in the oppositely disposed shackles 22—22. The bolt shank is preferably fitted tightly in the shackle apertures 25—25, to insure that when the upper and lower portions of the spring yield there will certainly be relative movement between the bolt shank and the sleeve which lies therearound.

Each of the master leaves of the upper and lower portions of the spring is provided with the usual cylindrical bearing or sleeve portion indicated at 26 and snugly fits the shank of the shackle bolt. As is usual, the bolt shank is flattened at 27' to provide a small space or passage between the bolt shank and the inner cylindrical surface of the spring sleeve 26. All portions of the bolt shank except the flattened portion thereof snugly fit the inner cylindrical surface of the sleeve, so that the mechanism presently to be described will not function to supply an excess of grease to the wearing surfaces of the sleeve and bolt when there is no relative movement between the bolt and sleeve.

Extending through the shackle bolt head and shank and terminating at a point near the externally threaded end of the latter is a cylindrical bore 27. A comparatively small bore 28 affords communication between the atmosphere and the inner end of bore 27. The bolt head is conveniently provided with internal threads to receive the threaded end of a grease cup shank 29, which is arranged to coöperate in the usual manner with the grease cup cap 30.

The grease cup shank is preferably of the type comprising a ball check valve 29ª which is normally seated against pressure from the outside by spring 29ᵇ.

The small radial opening 31 in the bolt shank affords communication between the bore 27 and the space between the sleeve and the flattened portion of the bolt shank. Disposed in bore 27 is a spring and plunger mechanism which maintains the lubricant in bore 27 under a definite pressure after it has been forced therein under pressure. The specific spring and plunger mechanism shown in Figs. 2 and 3 moreover indicate the quantity of lubricant contained within bore 27 at any time. The plunger device shown in Figs. 2 and 3 comprises a cup leather 32, drawn metal cylindrical member 33 and a plunger rod 34. The plunger rod is conveniently provided with an inner end of reduced cross-section which extends through registering apertures in the member 33 and the cup leather 32 and is riveted over a suitable washer as shown securely to retain the member 33 and the cup leather 32 together. The outer end of plunger rod 34 passes freely through the bore 28 and by its position serves to indicate the quantity of lubricant contained within bore 27.

It will be noted that cup leather 32 faces toward the radial bore 31 and is normally urged in that direction by compression spring 35. One end of spring 35 is inclosed by cylindrical member 33 while the other end of the spring bears against the shoulder at the junction of co-axial bores 27 and 28.

In Fig. 2, the bore 27 is shown partially filled with grease with the result that spring 35 is partially compressed. Additional grease can be forced under pressure past the check valve 29 into bore 27 by turning down grease cup 30. When further grease is thus forced under pressure into bore 27, the plunger is moved to the left (Fig. 2) and spring 35 is compressed. It will be noted that cylindrical member 23 serves to prevent buckling of the spring 35 and by contact with the shoulder at the junction of bores 27 and 28 serves to prevent the spring from being compressed beyond a certain point. Furthermore, rod 34 being fixed with respect to the cup washer, moves therewith, with the result that the length of that portion of rod 34 which projects outwardly beyond the end of the bolt indicates the quantity of grease within bore 27. As the spring 35 is compressed, the air behind the cup washer 32 and cylindrical element 33 escapes through bore 28. It will be understood that the cap 30 may be replenished with grease as often as required in order that the requisite amount of grease may be forced under pressure into bore 27.

The ball check valve 29 prevents the escape of grease from passage 27 through any avenue save the small radial bore 31, despite the fact that spring 35 maintains the lubricant under considerable pressure which, of course, is dependent upon the strength of the spring and the point at which it has been compressed by the grease forced into the bore 27 as has been previously explained.

I have found that due to the snug fit between the shackle bolt and the sleeve, an excess quantity of lubricant is not forced from the bore 27 despite the fact that the lubricant is maintained under considerable pressure by the spring 35. In fact, when there is no relative movement between the shackle bolt and the sleeve, there is no flow of lubricant through the small aperture 31. On the other hand, when the sleeve is caused to move relatively to the shackle bolt, the spring 35, acting against the plunger, acts positively to force sufficient lubricant through the aperture 31 adequately to lubricate the coöperating surfaces of the sleeve and shackle bolt.

In my improved shackle bolt the lubricant is maintained under pressure at all times after it is forced into the bore 27 by the grease cup cap or other equivalent means. In ordinary constructions the lubricant is forced into the hollow shackle bolt under pressure, but since the lubricant is practically non-compressible, it is under no pressure after the application of the pressure used to force it into the bolt ceases.

One of the objects of the construction herein shown and described is to prevent the escape of grease between the shackles and the ends of the spring sleeve 26 and at the same time effectively lubricate the wearing ends of the sleeve. This object is very effectively accomplished by means of the two pairs of concentric yielding and non-yielding washers, one of which pairs is illustrated in detail in Figs. 4 and 5. Each of these pairs consists of a compressible felt washer 36 and a non-compressible washer 37 preferably formed of phosphor bronze. The inner diameter of the felt washer is substantially equal to the diameter of the bolt shank while the inner diameter of the washer 37 is substantially equal to the outer diameter of the felt washer. Prior to the assembly of the shackle bolt elements as shown in Fig. 2, the thickness of the felt washer 36 is considerably greater than that of the bronze washer 37 as is clearly shown in Fig. 4.

When the shackle bolt and its coöperating parts are assembled, one of the pairs of concentric yielding and non-yielding washers is inserted between each of the shackles 22 and the adjacent end of the sleeve 26 and the several parts are so secured in position that the ends of sleeve 26 lie immediately adjacent the washers 37 with the result that the felt washers are compressed to such a degree that each of said felt washers is confined wholly within the closed annular space defined by the bolt shank, its associate washer 37, the adjacent shackle 22 and the adjacent end of sleeve 26. This arrangement is very effective because the compressed felt fits the several parts last above mentioned very snugly and thus prevents undue escape of lubricant around the ends of the sleeve 26. Moreover the compressible felt washer serves to absorb a very considerable portion of the oil contained in the grease and supplies this oil to the surfaces of the metal washer 37 and the adjacent end of sleeve 26 with the result that the engaging surfaces of these parts are thoroughly lubricated.

The modification shown in Figs. 6, 7 and 8 differentiates from the arrangement shown in the preceding figures only in the construction of the plunger elements. In this arrangement I have dispensed with the indicating rod and have formed the plunger of two parts, a drawn metal cylindrical member 50 and a cup leather 51. The cylindrical member 50 is preferably so formed that its closed end is provided with a hollow boss 52 having substanially the cross section shown in Fig. 7. This arrangement renders it a simple matter to secure the cup leather in position since all that it is necessary to do is to slip the cup leather over the boss and then give the latter a light hammer blow to flatten and widen the end of the boss, as is clearly shown in Fig. 8.

While I have illustrated the improvements of my invention applied to a shackle bolt, it will be understood that the invention is equally applicable to king bolt bearings and other analogous constructions. Furthermore, while I have illustrated an ordinary grease cup shank as a means through which lubricant may be forced into the hollow shackle bolt, and have shown an ordinary grease cup cap for forcing the lubricant into the bolt against the action of the compression spring, and a ball check valve for preventing the compression spring from ejecting the lubricant through the supply opening, any suitable means may be utilized for forcing the lubricant into the shackle bolt and for preventing its escape through the supply opening after the spring has been compressed as herein described.

Having thus described my invention, what I claim as new and desire to secure by Letters Patent of the United States is:

1. A shackle bolt having a longitudinal bore therein, extending from one end thereof to a point short of the other end thereof, a second and smaller bore extending from the last mentioned end of the bolt to said larger bore and affording communication between said larger bore and the atmosphere, a piston in said larger bore, a compression spring tending to move said piston away from said smaller bore, a radial passage in said bolt extending from the larger bore to the outer surface of the bolt, means through which lubricant may be forced under pressure into said larger bore to compress said spring, a device for preventing said spring from ejecting the lubricant through said last mentioned means, and a rod having one end thereof attached to said piston and the other end thereof extending freely through said smaller bore and projecting beyond the end of the bolt, said rod, by its position, serving to indicate the quantity of lubricant contained in said larger bore.

2. A bolt of the class described, having a longitudinal passage therein, a radial opening extending from said passage to the outer surface of the bolt, means through which lubricant, under pressure, may be forced into said passage, a device for preventing the escape of lubricant through said last mentioned means, a piston in said passage, a spring in said passage acting against the piston and tending to move said plunger to force the lubricant out of said passage, whereby said spring is compressed when lubricant is forced into said passage under pressure, a passage affording communication between the atmosphere and the space behind said plunger, and a rod attached to said piston, said rod extending through an aperture in the bolt and projecting beyond the end of the bolt to indicate the quantity of lubricant contained in said longitudinal passage.

3. In combination with a bearing comprising a cylindrical male member and a female member in the form of a sleeve fitting around said male member, a longitudinal passage in said male member, a radial opening extending from said passage to the outer surface of the male member, means whereby lubricant may be forced into said passage and its escape prevented through any avenue save the radial opening aforesaid, a piston in said passage, a compression spring acting against said piston, said spring tending to oppose the supply of lubricant to said passage whereby said spring is compressed when the lubricant is forced into said passage under pressure, means for permitting the escape of air from behind said piston when said spring is compressed and an indicating device secured to said piston and extending freely through an aperture in the bolt, said indicating device by its position serving to indicate the quantity of lubricant contained in said longitudinal passage.

4. A bolt of the class described, having a longitudinal passage therein, a second passage extending from the longitudinal passage to the outer surface of the bolt, means whereby lubricant, under pressure, may be forced into said longitudinal passage and its escape therefrom prevented except to the outer surface of the bolt, a piston in said longitudinal passage, compressible resilient means acting against said piston, said resilient means tending to oppose the supply of lubricant to said longitudinal passage, and an indicating rod connected with said piston and extending freely through an aperture in one end of the bolt, said rod by its position serving to indicate the position of the piston within the bolt.

5. A bolt of the class described, having a longitudinal passage therein, a second passage extending from the longitudinal passage to the outer surface of the bolt, means whereby lubricant, under pressure, may be forced into said longitudinal passage and its escape therefrom prevented except to the outer surface of the bolt, a piston in said longitudinal passage, compressible resilient means acting against said piston, said resilient means tending to oppose the supply of lubricant to said longitudinal passage, together with means connected with said piston and extending freely through one end of the bolt arranged to indicate the position of the piston within the bolt.

6. In combination with a shackle bolt of the hollow type comprising means for supplying grease thereto and a radial passage extending from the inside of the bolt to the outer surface thereof, shackles fitted around said bolt near the ends thereof, a sleeve fitted around the bolt and disposed between the shackles, together with means for preventing the escape of grease around the ends of the sleeve, and for lubricating the ends of the sleeve, said last mentioned means comprising a pair of concentric washers lying between each end of the sleeve and the adjacent shackle, the inner washer in each case being formed of compressible material capable of absorbing oil from the grease, the outer washer in each case being of non-compressible material.

7. In combination with a shackle bolt of the hollow type comprising means for supplying grease thereto and a radial passage extending from the inside of the bolt to the outer surface thereof, shackles fitted around said bolt near the ends thereof, a sleeve fitted around the bolt and disposed between the shackles, together with means for preventing the escape of grease around the ends of the sleeve and for lubricating the ends of the sleeve, said last mentioned means comprising two pairs of concentric inner and outer washers, one of said pairs disposed between each end of the sleeve and the adjacent shackle, the outer washer in each case being of metal and the inner washer in each case being formed of compressible material capable of absorbing the oily constituents of the grease.

8. In combination with a bolt of the hollow type comprising means for supplying grease thereto and a radial passage extending from the inside to the outside of the bolt, a sleeve fitted around said bolt, a shackle attached to said bolt and lying adjacent one end of said sleeve and means for preventing the escape of grease between the shackle and sleeve and for lubricating the end of the sleeve comprising a pair of inner and outer concentric washers disposed between the sleeve and shackle, the outer washer being formed of metal, the inner washer being formed of compressible material capable of absorbing the oily constituents of the grease.

9. In combination with a bolt of the hollow type comprising means for supplying lubricant thereto and a radial passage extending from the inside to the outer surface of the bolt, a sleeve fitted over said bolt, a member carried by the bolt lying adjacent one end of said sleeve and means for preventing the escape of grease between said member and the sleeve and for lubricating the end of the sleeve comprising a pair of inner and outer concentric washers disposed between said member and said sleeve, the outer sleeve being formed of non-compressible material and the inner sleeve being formed of compressible material.

10. In combination with a bolt of the hollow type comprising means for supplying lubricant thereto and a radial passage extending from the inside to the outer surface of the bolt, a sleeve fitted over said bolt, a member carried by the bolt lying adjacent one end of said sleeve and means for preventing the escape of grease between said member and the sleeve and for lubricating the end of the sleeve comprising a pair of inner and outer concentric washers disposed between said member and said sleeve, the outer sleeve being formed of non-compressible material and the inner sleeve being formed of compressible material, the compressible washer being initially of greater thickness than the non-compressible washer but being compressed and confined in the annular space defined by said member, the end of the sleeve, the outer washer and the bolt.

11. In combination with a bolt of the hollow type comprising means for supplying grease thereto and a radial passage extending from the inside to the outside of the bolt, a sleeve fitted around said bolt, a shackle attached to said bolt and lying adjacent one end of said sleeve and means for preventing the escape of grease between the shackle and sleeve and for lubricating the end of the sleeve comprising a pair of inner and outer concentric washers disposed between the sleeve and shackle, the outer washer being formed of metal, the inner washer being formed of compressible material capable of absorbing the oily constituents of the grease, the compressible washer being initially of greater thickness than the non-compressible washer but being compressed and confined in the annular space defined by the bolt, the outer washer, the shackle and the end of the sleeve.

In witness whereof, I hereunto subscribe my name this 16th day of February, 1920.

JOHN ANDREW FESLER.

Witnesses:
 N. E. HEREN,
 B. I. NEALE.